(12) United States Patent
Yamaguchi et al.

(10) Patent No.: US 9,880,749 B2
(45) Date of Patent: Jan. 30, 2018

(54) STORAGE METHOD AND DEVICE FOR CONTROLLING THE OUTPUT TIMING OF COMMANDS BASED ON A HOLD TIME

(71) Applicant: KABUSHIKI KAISHA TOSHIBA, Minato-ku, Tokyo (JP)

(72) Inventors: Kensaku Yamaguchi, Kanagawa (JP); Shingo Tanaka, Kanagawa (JP); Shinya Murai, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/821,987

(22) Filed: Aug. 10, 2015

(65) Prior Publication Data

US 2015/0347033 A1    Dec. 3, 2015

Related U.S. Application Data

(63) Continuation of application No. PCT/JP2014/053827, filed on Feb. 12, 2014.

(30) Foreign Application Priority Data

Feb. 12, 2013  (JP) ................................ 2013-024644

(51) Int. Cl.
*G06F 3/06* (2006.01)

(52) U.S. Cl.
CPC .......... *G06F 3/0611* (2013.01); *G06F 3/0655* (2013.01); *G06F 3/0659* (2013.01); *G06F 3/0673* (2013.01); *G06F 3/0679* (2013.01)

(58) Field of Classification Search
CPC .... G06F 9/3004; G06F 3/0611; G06F 3/0655; G06F 3/0659; G06F 3/0679;

(Continued)

(56) References Cited

U.S. PATENT DOCUMENTS 5,822,244 A    10/1998    Hansen et al.
6,115,785 A     9/2000    Estakhri et al.
(Continued)

FOREIGN PATENT DOCUMENTS

JP    11-175391      7/1999
JP    2003-256266    9/2003
(Continued)

OTHER PUBLICATIONS

Japanese Office Action for Japanese Patent Application No. 2013-024644 dated May 17, 2016. Translated to English by Global Dossier on Jun. 24, 2016 at 17:00:22 JST—Dictionary last updated on Jun. 21, 2016.

(Continued)

*Primary Examiner* — Than Nguyen
(74) *Attorney, Agent, or Firm* — Amin, Turocy & Watson LLP

(57) ABSTRACT

According to one embodiment, there is provided a storage controlling device including a receiving unit and a controlling unit. The receiving unit receives a read command or a write command for a storage device, from an internal or external command issuing device. The controlling unit holds the write command received by the receiving unit until at least a first interval time has elapsed after outputting a write command received most recently before the write command is received, and then outputs the write command which is held after the first interval time has elapsed. The controlling unit outputs the read command received by the receiving unit, prior to outputting the write command that is held, when the read command is received during a time when the write command is held.

11 Claims, 10 Drawing Sheets

(58) Field of Classification Search
CPC ... G11C 11/1693; G11C 11/2293; G11C 7/22; G11C 16/32
USPC .................................................. 711/155, 167
See application file for complete search history.

(56) References Cited

U.S. PATENT DOCUMENTS

| | | | |
|---|---|---|---|
| 6,928,499 B2 * | 8/2005 | Kitakami ...................... | 710/104 |
| 7,702,841 B2 | 4/2010 | Shima | |
| 2007/0198768 A1 | 8/2007 | Kim et al. | |
| 2008/0222330 A1 * | 9/2008 | Shima ........................... | 710/106 |
| 2009/0031093 A1 * | 1/2009 | Davis et al. .................. | 711/154 |
| 2010/0100664 A1 | 4/2010 | Shimozono | |
| 2011/0271133 A1 * | 11/2011 | Kim et al. ..................... | 713/401 |
| 2012/0179860 A1 | 7/2012 | Falanga et al. | |

FOREIGN PATENT DOCUMENTS

| | | |
|---|---|---|
| JP | 2007-226802 | 9/2007 |
| JP | 2008-250985 | 10/2008 |
| JP | 2010-102369 | 5/2010 |
| JP | 2012-529692 | 11/2012 |

OTHER PUBLICATIONS

International Search Report for International Patent Application No. PCT/JP2014/053827 dated Jun. 3, 2014, 1 page.
Japanese Office Action for Japanese Patent Application No. 2013-024644 dated Aug. 9, 2016. Translated to English by Global Dossier on Sep. 12, 2016 at 18:37:45 JST—Dictionary last updated on Jul. 24, 2016.

* cited by examiner

STORAGE METHOD AND DEVICE FOR CONTROLLING THE OUTPUT TIMING OF COMMANDS BASED ON A HOLD TIME

CROSS REFERENCE TO RELATED APPLICATIONS

This application is a Continuation of International Application No. PCT/JP2014/053827, filed on Feb. 12, 2014, the entire contents of which is hereby incorporated by reference.

FIELD

Embodiments described herein relate to a storage controlling device, a storage controlling method, a storage system and a program.

BACKGROUND

As an alternative device for a conventional hard disk drive (HDD), in which various data are stored, there is known a high-capacity storage device that includes a flash memory as a storage element. This storage device is generally called a solid state drive (SSD). The SSD has advantages of a shorter access time compared to the HDD, a low likelihood of a failure by a physical impact, and the like. However, the writing speed is slower than the reading speed, and therefore, it includes a problem in that the response time in a reading access increases when write commands are issued in concentration before the read command.

DETAILED DESCRIPTION

Figure 1:
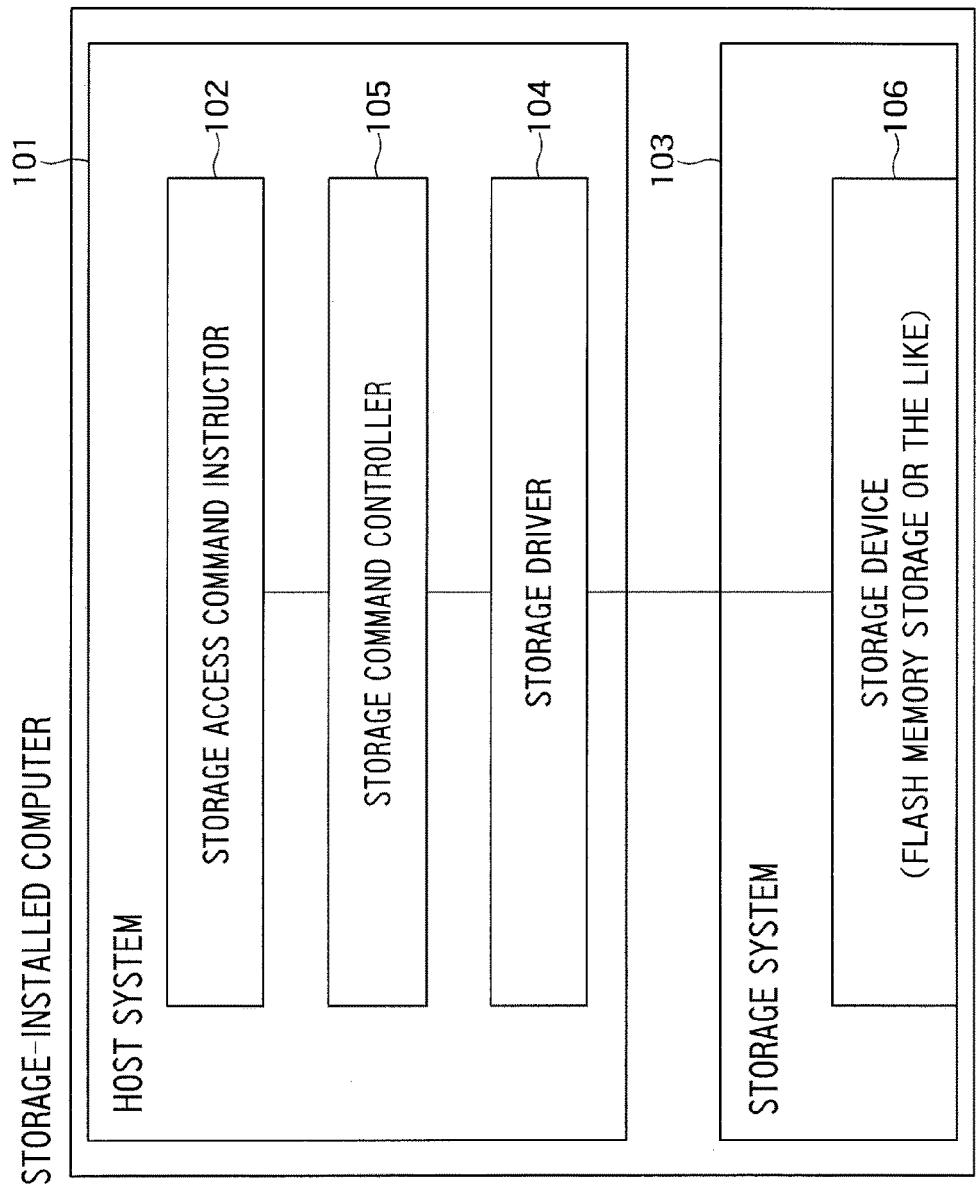
FIG. 1 is a block diagram showing an overall configuration of a storage-installed computer according to a first embodiment.

According to one embodiment, there is provided a storage controlling device including a receiving unit and a controlling unit.

The receiving unit receives a read command or a write command for a storage device, from an internal or external command issuing device.

The controlling unit holds the write command received by the receiving unit until at least a first interval time has elapsed after outputting a write command received most recently before the write command is received, and then outputs the write command which is held after the first interval time has elapsed.

The controlling unit outputs the read command received by the receiving unit, prior to outputting the write command that is held, when the read command is received during a time when the write command is held.

Hereinafter, the technological background about embodiments of the present invention will be first described.

In a solid state drive (SSD), a flash memory is used as a storage element, and the SSD has a feature of a shorter access time compared to a conventional HDD. Meanwhile, the flash memory to be used in the SSD has a restriction that it is impossible to overwrite an area where data have already been written, with new data.

When writing other data to an area in the flash memory where data have already been written, it is necessary to once erase the data in the area and then write the new data.

Since the erasing of the flash memory is an operation that takes a long time, there is a problem in that if the erasing is performed on every data-overwriting, the writing cannot be performed at a high speed.

Hence, there is a scheme in which data to be newly written are written to another area in the flash memory where the erasing has been performed in advance. The SSD retains management information showing an area in the flash memory where data has been stored, and updates the management information when data are[is] written to the SSD such that it shows a location where the written data are present. By performing the writing according to the scheme, the data writing speed is significantly improved, compared to the case where the erasing is performed on every overwriting.

However, as a result of repeating the writing, when in-advance-erased areas in the flash memory become decreased, there is a need to perform the erasing of the flash memory before writing data.

Thereby, the writing access time in the SSD is not constant, and the case where the erasing is necessary requires a longer writing access time compared to the case where the erasing is unnecessary.

Furthermore, when the reading is requested while the writing access is being performed, the reading access is executed after the writing access is completed. Thereby, the delay in the case where the writing access requires the erasing of the flash memory causes an increase in the response time in the reading access as well.

In a storage system including the SSD that has such a property, there is a technique that avoids an increase in the response time in the reading access.

In the technique, the storage system has a RAID configuration, and redundantly retains data in multiple SSDs.

The response time in the reading access to the SSD increases in the case where the writing is being performed. Therefore, by utilizing data redundantly retained to perform the reading from an SSD in which the writing is not being performed, it is possible to avoid an increase in the response time in the reading access. However, the application of this technique requires the redundant data retention, resulting in inefficiency in the use of the storage capacity.

In the case of providing redundancy by parity, such as in RAID 5, the volume of data that need to be read from the SSD for obtaining target data is greater than the volume of the target data. That is, considering the case where the storage system was requested to obtain data that resides in a drive where writing is presently being performed, since it is necessary to read data including redundancy data from all of the drives in the RAID set except for the drive where the writing is being performed in order to restore the target data based on the redundancy, the volume of the data to be read is greater than the volume of the target data. Thereby, the throughput of the reading in the storage system decreases compared to the case where the technique is not used.

The embodiments of the present invention propose a scheme that solves these problems and suppresses a decrease in the throughput of the reading from a storage device. Here, in the embodiments of the present invention, as the storage device, in particular, an SSD is assumed. However, the storage device is not limited to this, and may be another device such as an HDD or an SD card.

Hereinafter, the embodiments of the present invention will be described in detail with reference to the drawings.

First Embodiment

FIG. 1 is a block diagram showing a storage-installed computer according to a first embodiment.

This storage-installed computer includes a host system 101 and a storage system 103.

The host system 101 executes various applications on an operating system. These applications access the storage system 103 through a storage access command instruction unit [or director, or instructor] (a command issuing device) 102, a storage command controller 105 and a storage driver 104. These elements 102, 105, 104 may be implemented in the operating system, for example. Concrete examples of the operating system include Windows®, Linux® and the like.

The computer is not limited to a specific use application, and as an example, can be used as a server for image streaming delivery. Image data to be delivered are stored in a storage device 106 of the storage system 103. The image data in the storage device 106 are read and streaming-delivered through a network to a client, which is not shown in the figure. In order to assure steady transmission of the image data to the client, a stable (low-delay) data retrieval from the storage device 106 is required. Thereby, when there is a time overlap between a writing of image data to the storage device 106 and a reading of image data at the time of delivery to the client, it is necessary that the reading of the image data should not be delayed by the writing of the image data.

The storage access command instruction unit 102 issues a write command and a read command. For example, when an application operating in the host system reads out data such as a file in the storage device 106 to the host system, the storage access command instructor 102 issues a read command. On the other hand, when the application writes a file to the storage device 106, the storage access command instructor 102 issues a write command. The issued commands are passed to the storage command controller 105.

The storage access command instruction unit 102 may include a buffer to temporarily hold the issued commands. In this case, the storage access command instruction unit 102 outputs the commands in the buffer in the stored order. Alternatively, the storage access command instruction unit 102 makes the storage command controller 105 acquire the commands in the buffer in the stored order. Another possible configuration is where the storage access command instruction unit 102 exchanges control signals with storage system 103 and then outputs the commands. For example, the storage access command instruction unit 102 outputs a control signal to the storage device 106 through the storage command controller 105 and the storage driver 104. The storage device 106 returns a control signal granting permission to issue a command to the storage access command instruction unit 102, when it [already] is ready to receive the command, or when it [subsequently] becomes ready to receive the command. Once it receives the control signal, the storage access command instruction unit 102 outputs the command.

Here, the storage access command instruction unit 102 is not limited to implementation in the host system, and may be implemented in another subsystem (for example, in another storage system, in a network IF[interface] system, or the like). It does not need to be monolithic, and may be implemented in both of the host system and another subsystem. The same goes for the other embodiments described later.

Similarly, the storage command controller 105 does not need to be monolithic, and may be implemented in both the host system and another subsystem. The same goes for the other embodiments described later.

The storage command controller 105 according to the embodiment controls the output of the command received from the storage access command instruction unit 102, and outputs the command to the storage driver 104 accessing the storage device. The storage driver 104 accesses the storage device 106, based on the command received from the storage command controller 105. For example, the storage driver 104 converts the command received from the storage command controller 105 into a form suitable for the storage device 106, and outputs it to the storage device 106. The storage command controller 105 receives an execution result of the command executed in the storage device 106, through the storage driver 104. The storage command controller 105 returns the execution result to the storage access command instruction unit 102.

The storage device 106 is a device in which data are stored, for example, an SSD (Solid State Drive). The storage device 106 may be a RAID system in which multiple SSDs are connected. The storage device 106 may be any storage device having the property that the writing speed is slower than the reading speed. It is possible to be an SD memory card, an HDD, or the like. The host system 101 and the storage system 103 may be connected by any interface allowing for connection of a storage device, such as PCI Express, Fibre Channel, Ethernet, USB[Universal Serial Bus], Thunderbolt, SATA[Serial ATA] or SAS[Serial Attached SCSI].

The storage device 106 executes the command received from the storage command controller 105 through the storage driver 104. The storage device 106 may include a buffer for storing the commands to be executed. The storage device 106 executes the commands in the stored order, and in the case of a read command, reads data from the corresponding storage area and writes them to a memory designated by the host system. In the case of a write command, it specifies a storage area to be used for the data writing and writes data to the specified storage area. When a data-writable storage area (a data-erased storage area) is not present, an area is acquired by erasing unnecessary data, and data are written to the reserved area. As described later, when specific conditions are met, the storage device may perform a data erasing process to erase unnecessary data and acquire a vacant area.

Figure 2:
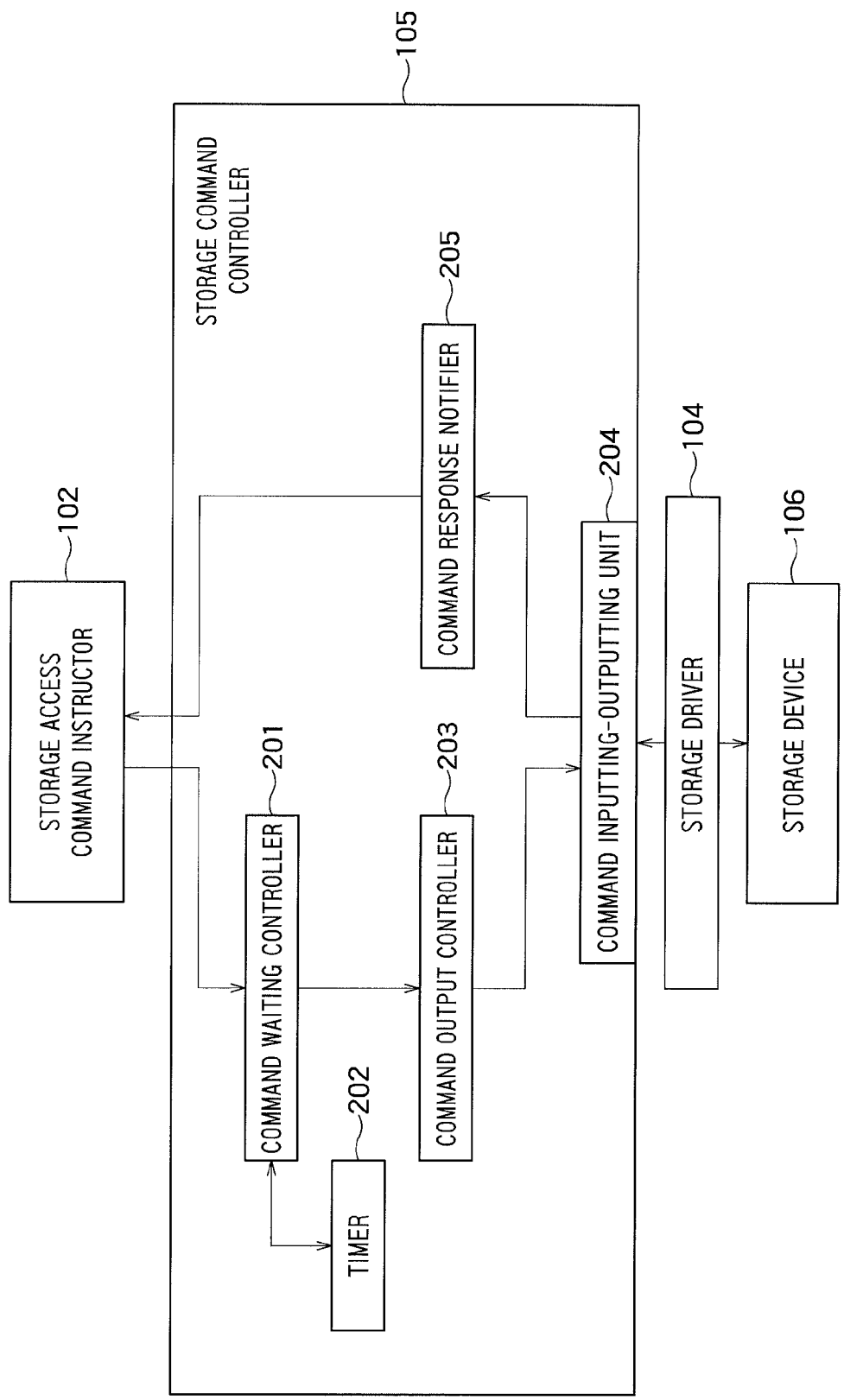
FIG. 2 is a block diagram showing a detailed configuration of the storage-installed computer shown in FIG. 1.

FIG. 2 is a block diagram showing a detailed configuration of the storage-installed computer shown in FIG. 1. In particular, a detailed configuration of the storage command controller 105 is shown.

The storage access command instruction unit 102 issues a write command and a read command for the storage device.

Figure 8:
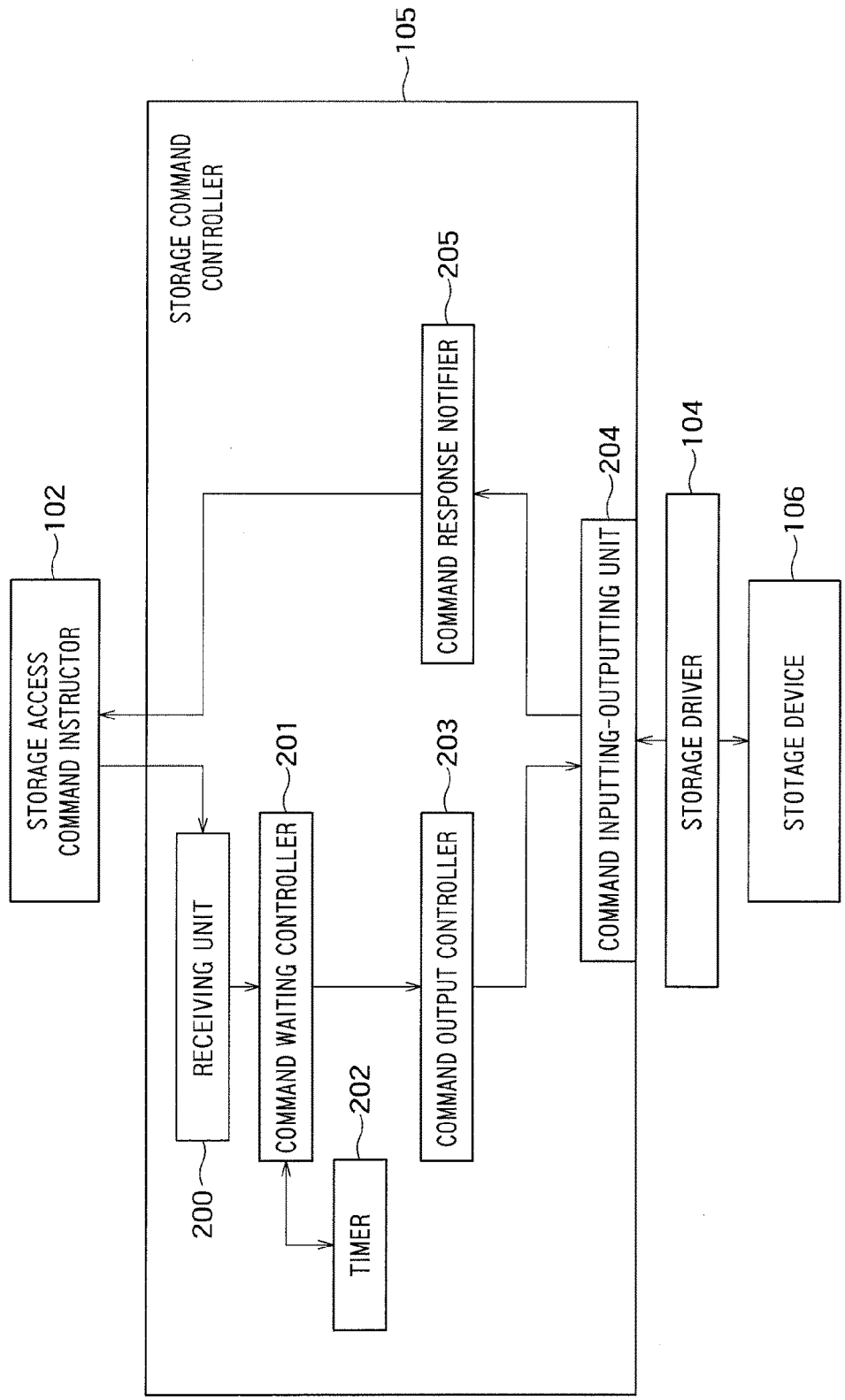
FIG. 8 is a block diagram showing another exemplary configuration of a storage command controller according to the first embodiment.

The issued command is received by a command waiting controller 201. The command waiting controller 201 includes a receiving unit to receive the command. Alternatively, a function of receiving the command from the storage access command instruction unit 102 may be separated from the command waiting controller 201, and as shown in FIG. 8, be provided as a receiving unit 200. In this case, the receiving unit 200 receives the command from the storage access command instruction unit 102, and the receiving unit 200 sends out the command to the command waiting controller 201. The command waiting controller 201 discriminates whether the received command is a write command or a read command. The command waiting controller 201 includes a buffer for temporarily storing write commands.

When the received command is a read command, the command waiting controller 201 immediately outputs the command to a command output controller 203. When the received command is a write command, the write command is waited or held in the above buffer until at least a certain time (a first interval time) has elapsed since output of a write command that was received ahead of the write command, using a timer 202. When the certain time has elapsed, the write command is output from the buffer.

When a read command is received while a write command is held, the read command is output to the command output controller 203 before the held write command is output. When another write command is received while a write command is held, the other write command is additionally stored in the buffer behind the write command previously received. The other write command is output after a certain time has elapsed since the write command in front of the other write command is output.

Preferably, the length of the output interval time of write commands should be greater than or equal to the acceptable value for reading delay of read commands. The output interval time may be identical among all write commands. In this case, the output interval time may be determined based on the maximum, minimum, median, mean or another derived value of the writing data size (data volume) of [the] write commands. It is allowable to vary the interval time such that, as the writing size of a write command (called a preceding write command here) ahead of a write command (called a subsequent write command here) is greater, the interval time applied to the subsequent write command is increased.

The command output controller 203 outputs the command (read command or write command) input from the command waiting controller 201, through a command inputting-outputting unit 204. The output command is output to the storage device 106 by the storage driver 104.

A controlling unit according to the embodiment includes the command waiting controller 201 and the command output controller 203. When a write command is received, the controlling unit holds the write command until at least the first interval time has elapsed since the output of a write command received most recently before (i.e., [directly] preceding) the write command, and then outputs the write command to the storage driver 104 after the first interval time has elapsed. When a read command is received while the write command is held or waited, the controlling unit outputs the read command to the storage driver 104 before the write command that is waiting is output.

The command inputting-outputting unit 204 receives, through the storage driver 104, a command response that is an execution result of the command executed in the storage device 106, and notifies the command response to a command response notifier 205. When the reading by the read command is successful, a command response containing the read data is notified to the command response notifier 205. When the writing by the write command is successful, a command response containing a writing completion notice [indication] is notified to the command response notifier 205.

The command response notifier 205 returns the command responses notified from the command inputting-outputting unit 204, to the storage access command instruction unit 102.

Figure 7:
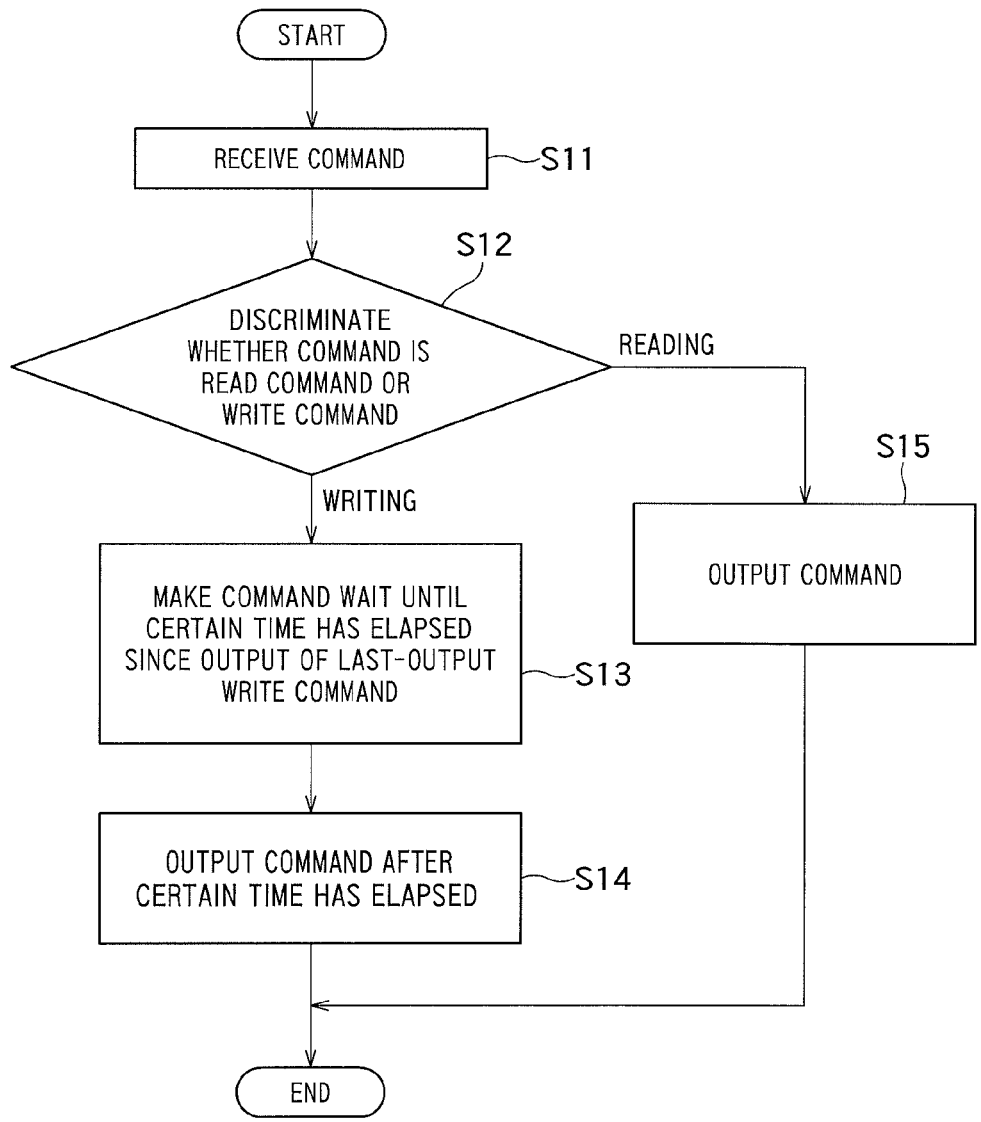
FIG. 7 is a flowchart for describing the behavior in the first embodiment.

FIG. 7 is a flowchart showing the behavior of the storage command controller 105 according to the embodiment.

A command is received from the storage access command instruction unit 102 (S11), and whether the received command is a write command or a read command is discriminated (S12). In the case of a write command, the write command is held until at least a certain time has elapsed since output of a write command received immediately before the write command (S13). When the certain time has elapsed, the write command is output to the storage driver 104 (S14). Here, the write command first received may be immediately output, because a write command before it is not present. On the other hand, in the case where a read command is received, the read command is immediately output to the storage driver 104 (S15). In the case where a waiting write command is present when the read command is received, the read command is output before the waiting write command.

As an example, suppose that a write command A, a read command B, a read command C, a write command D, and a read command E are received in that order. After the write command A is output, the read commands B, C are received. The read commands B, C are immediately output in this order. After the read command C is received, the write command D is received. The write command D waits until a certain time has elapsed since the output of the write command A, and thereafter, it [the write command D] is output. When the read command E is received while the write command D is waiting, the read command E is output before the write command D. In the case where at the instant when the write command D has been received, the certain time has already elapsed since the output of the write command A, the write command D is immediately output.

Figure 9:
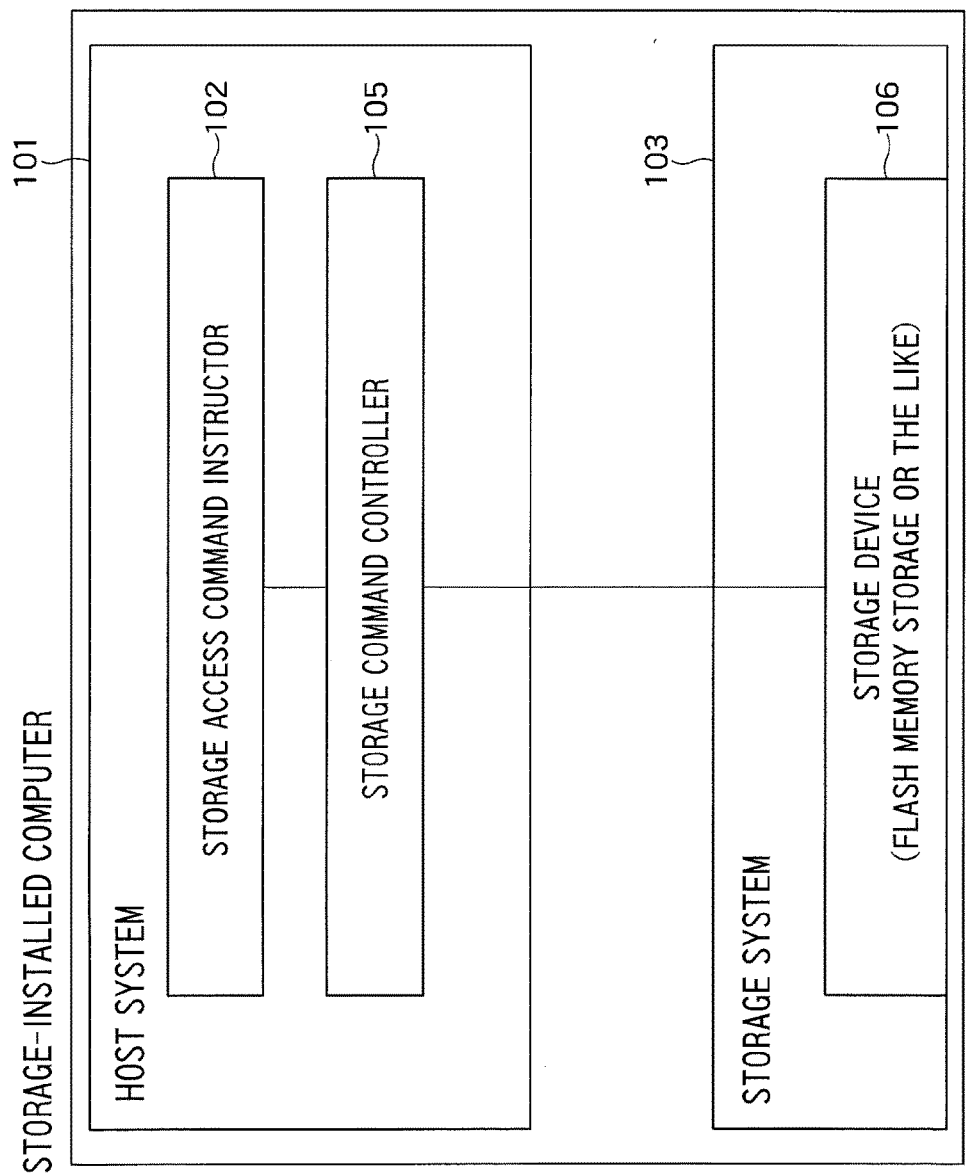
FIG. 9 is a block diagram showing a storage-installed computer according to a first modification.

FIG. 9 is a block diagram showing a storage-installed computer according to a first modification. For elements with the same names as FIG. 1, the same reference numerals are assigned. The difference from the configuration shown in FIG. 1 is that a storage driver is not provided between the storage command controller 105 and the storage system 103. In this case, the storage driver may be included in the storage access command instruction unit 102 as a part thereof. In the case of the configuration in FIG. 9, the output destination of a command from the storage command controller 105 is not a storage driver but the storage device. Thus, the present invention can be implemented also in the configuration in which a storage driver is not provided between the storage command controller 105 and the storage system 103.

Figure 10:
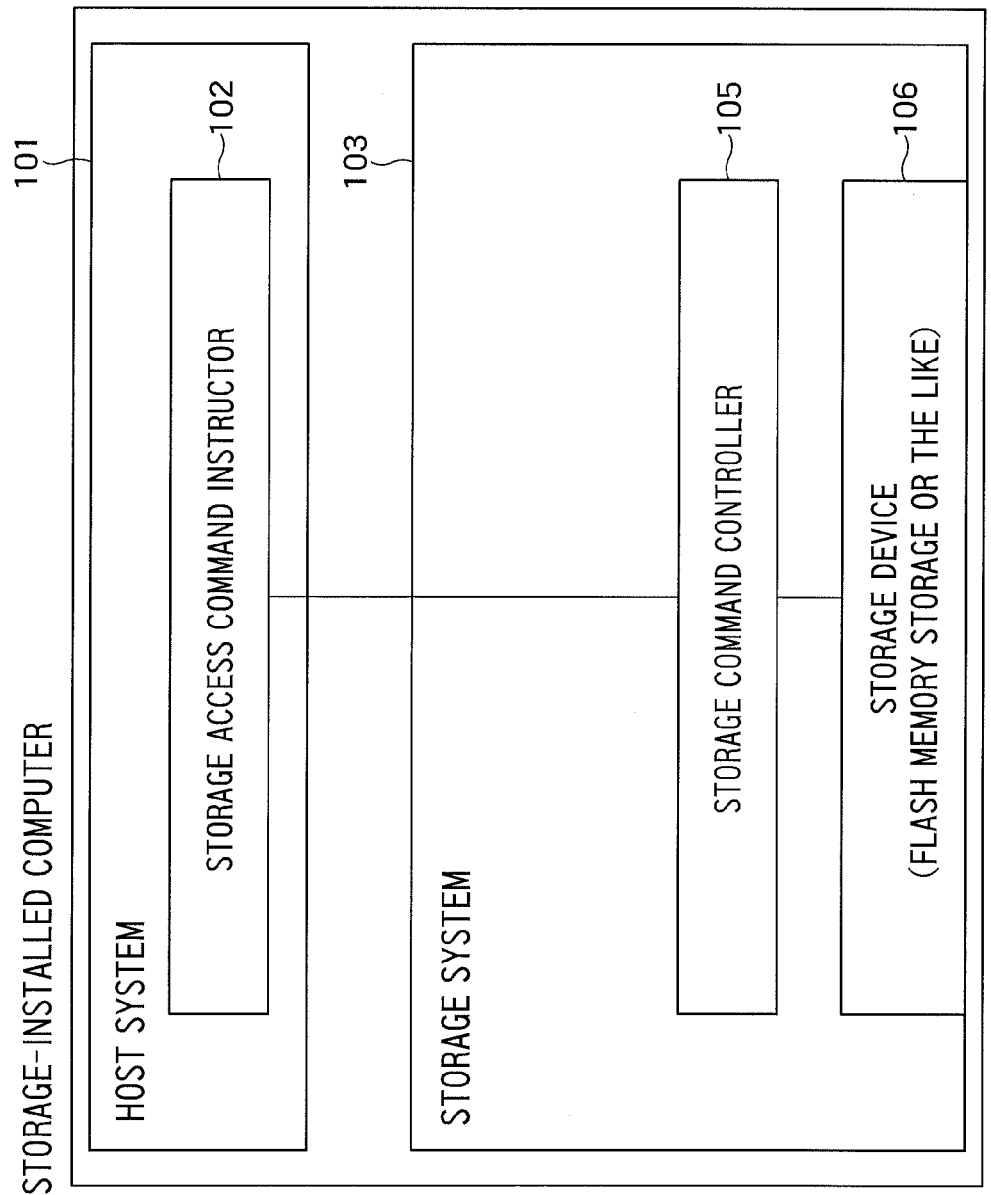
FIG. 10 is a block diagram showing a storage-installed computer according to a second modification.

FIG. 10 is a block diagram showing a storage-installed computer according to a second modification. For elements with the same names as FIG. 1, the same reference numerals are assigned. The difference from the configuration shown in FIG. 1 is that the storage command controller 105 is provided in the storage system, and that a storage driver is not provided between the storage command controller 105 and the storage system 103. The storage driver may be included in the storage access command instruction unit 102 as a part thereof. Thus, the present invention can be implemented also in the configuration in which the storage command controller 105 is provided not in the host system but in the storage system.

From the above, according to the embodiment, since a certain time or more of interval is provided between the output of write commands, it is possible to prevent write commands from successively being executed or waited [queued] before a read command is executed. Therefore, the possibility of an increase in reading access time (read delay) can be reduced. That is, the possibility that the read delay increases in excess of the acceptable value can be reduced. Here, the read delay can be defined as the time after the storage access command instruction unit 102 issues or outputs a read command and before it receives the command response, but is not limited to this.

Second Embodiment

Figure 3:
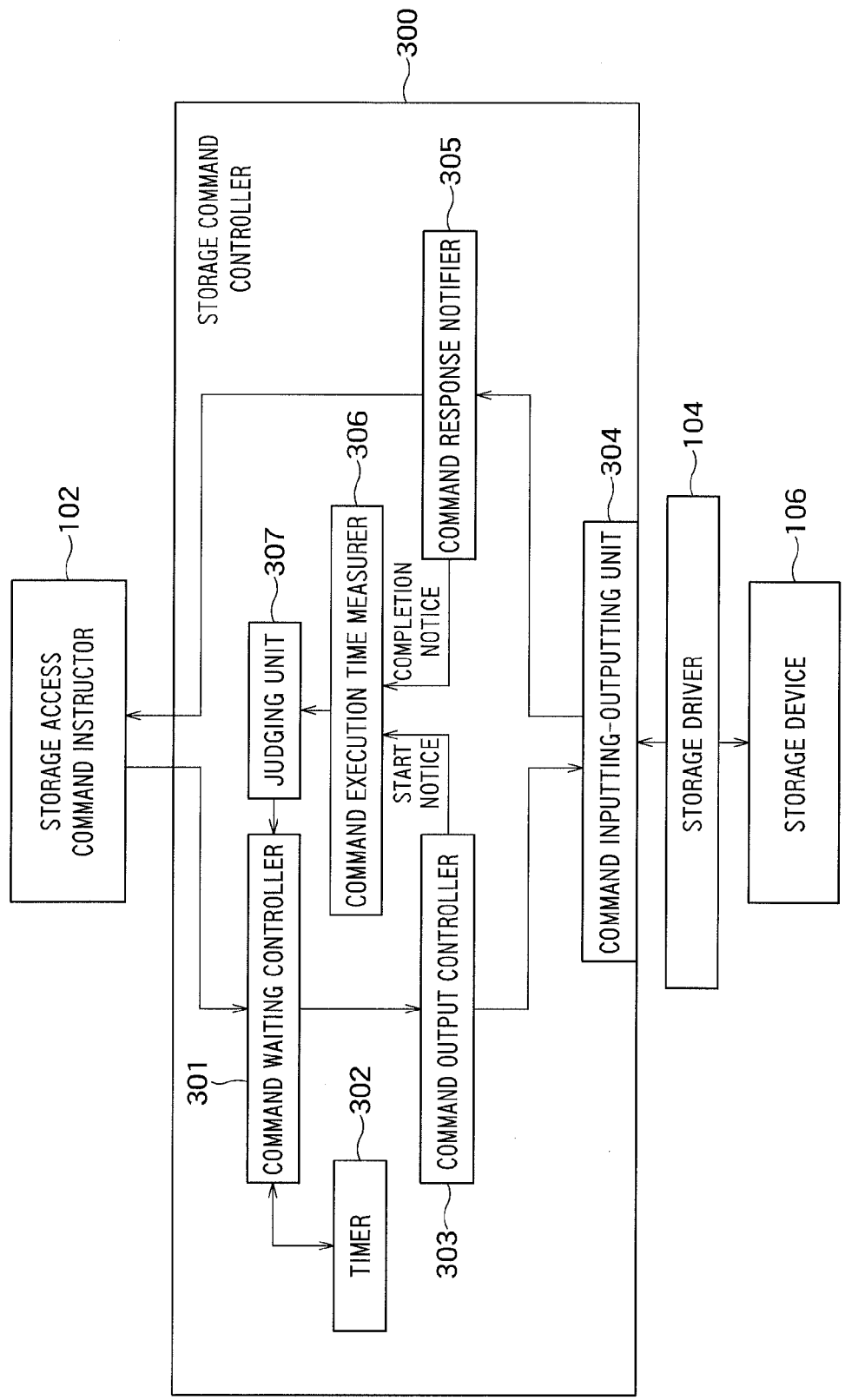
FIG. 3 is a block diagram showing a detailed configuration of a storage-installed computer according to a second embodiment.

FIG. 3 shows a detailed configuration of a storage-installed computer according to a second embodiment.

A command execution time measurer[measurement unit] 306 and a judging unit 307 are added to the storage command controller according to the first embodiment. The behavior of the other elements in a storage command controller 300, that is, a command waiting controller 301, a timer 302, a command output controller 303, a command inputting-outputting unit 304, and a command response notifier 305, is basically the same as the elements with the same names in the first embodiment, and repetitive descriptions are omitted except where a process is extended.

The command execution time measurer 306 measures a response time in an access of a write command or read command output to the storage driver 104 (a storage device, in the case of the configuration in FIG. 9 or FIG. 10). The command output controller 303 outputs a read command or a write command to the command inputting-outputting unit 304, and outputs a start notice to the command execution time measurer 306. The command response notifier 305 outputs a command response to the storage access command instruction unit 102, and notifies a completion notice to the command execution time measurer 306. The command execution time measurer 306 measures the response time by calculating the difference between the time when the completion notice is received and the time when the start notice is received.

The judging unit 307 compares the response time measured in the command execution time measurer 306 with a threshold. When the response time is greater than the threshold, it is possible to judge that the response time in the access is delayed. The possible cause for the delay is that there are many write commands waiting for execution in the storage device 106, that the data erasing process of a flash memory area was performed, and the like. The judging unit 307 outputs a signal showing whether the response time is greater than the threshold, to the command waiting controller 301.

In the case where a signal showing that the response time is equal to the threshold or less is input, the command waiting controller 301 uses the first interval time as the output interval time of the write command. On the other hand, in the case where a signal showing that the response time is more than the threshold is input, it uses a second interval time that is greater than the first interval time. The second interval time may be increased as the difference between the threshold and the response time is greater. Furthermore, different thresholds may be used depending on whether a read command or a write command is issued. In addition, different thresholds may be used depending on the reading data volume by the read command or the writing data volume by the write command.

As a modification, a configuration that does not use a threshold is possible. For example, the output interval time between write commands may be increased as the length of the response time is greater.

From the above, according to the embodiment, it is possible to prevent an increase in the read delay, caused by accumulation of write commands in the storage device.

Third Embodiment

Figure 4:
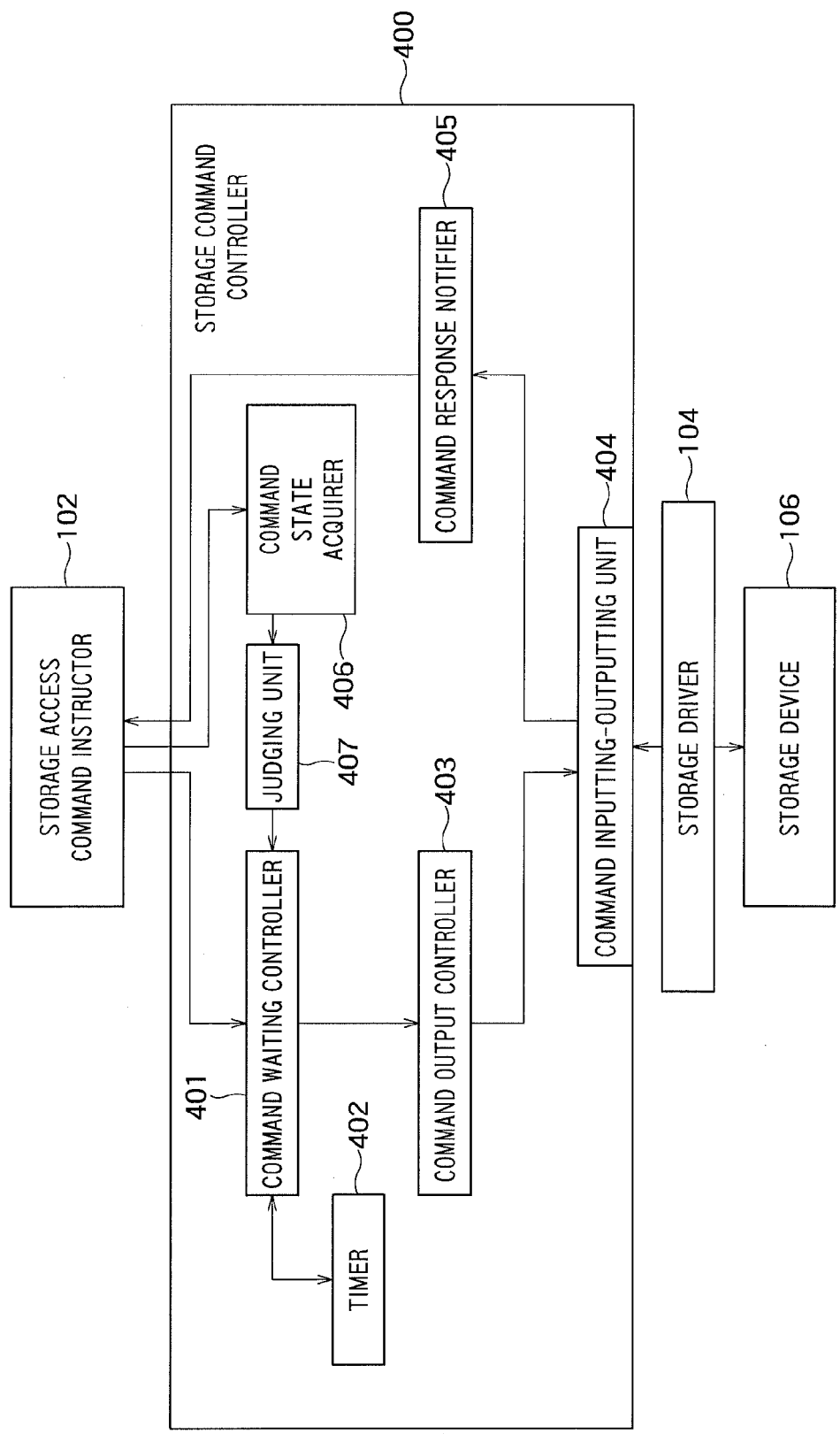
FIG. 4 is a block diagram showing a detailed configuration of a storage-installed computer according to a third embodiment.

FIG. 4 shows a detailed configuration of a storage-installed computer according to a third embodiment.

An command state acquirer 406 and a judging unit 407 are added to the storage command controller according to the first embodiment. The behavior of the other elements in a storage command controller 400, that is, a command waiting controller 401, a timer 402, a command output controller 403, a command inputting-outputting unit 404, and a command response notifier 405, is basically the same as the elements with the same names in FIG. 2, and repetitive descriptions are omitted except extended processes.

The command state acquirer 406 examines whether a read command waiting to be output to the storage command controller 400 is present in the buffer of the storage access command instruction unit 102. Such a read command corresponds to a read command that was issued in the storage access command instruction unit 102, but is remaining in the buffer without being output to the storage command controller 400. Such a situation can arise, for example, in the case of adopting the configuration in which the storage access command instruction unit 102 exchanges control signals with the storage device 106 and thereafter outputs a command, as described above.

When a read command waiting for output is present in the storage access command instruction unit 102, the judging unit 407 determines the output interval time of write commands such that the value is greater than the current value (for example, it is increased by a certain value), and instructs the determined value to the command waiting controller 401. The command waiting controller 401 changes the output interval time of write commands, in response to the instruction from the judging unit 407.

As an alternative exemplary configuration, the command state acquirer 406 may acquire the number of read commands waiting in the storage access command instruction unit 102. The judging unit 407 may set the output interval time of write commands, depending on the number of the read commands. The value of the output interval time of write commands may be increased as the number of the read commands is greater.

As a further alternative exemplary configuration, the command state acquirer 406 may acquire the reading data volumes of read commands waiting in the storage access command instruction unit 102. The judging unit 407 may calculate the total of the reading data volumes of the read commands, and set the output interval time of write commands, depending on the total data volume. The value of the output interval time of write commands may be increased as the total of the reading data volumes is greater.

From the above, according to the embodiment, when it is expected that the delay of the reading access is great, it is possible to prevent many write commands from accumulating before a read command. Therefore, it is possible to suppress an increase in the delay of the reading access.

Fourth Embodiment

In an SSD, when in-advance-erased areas in the flash memory are decreased, there is a need to perform a data erasing of the flash memory before writing data. Thereby, the writing access time in the SSD is not constant, and the case where the erasing is necessary requires a longer writing access time compared to the case where the erasing is unnecessary. The condition or timing of occurrence of such a writing involving the data erasing process depends on the history of previous write commands, and is highly associated with, for example, the number of write commands and the writing data volume. For example, when a certain writing data volume of write commands are repeatedly executed, the data erasing process can occur in the SSD, in a periodic or near-periodic manner. The embodiment is characterized in that as for a certain write command, when judging that the data erasing process is likely to occur in the storage device just before the execution of the write command, the output interval time to be applied to a write command following the certain write command is increased. In the following, the detail of the embodiment will be described.

Figure 5:
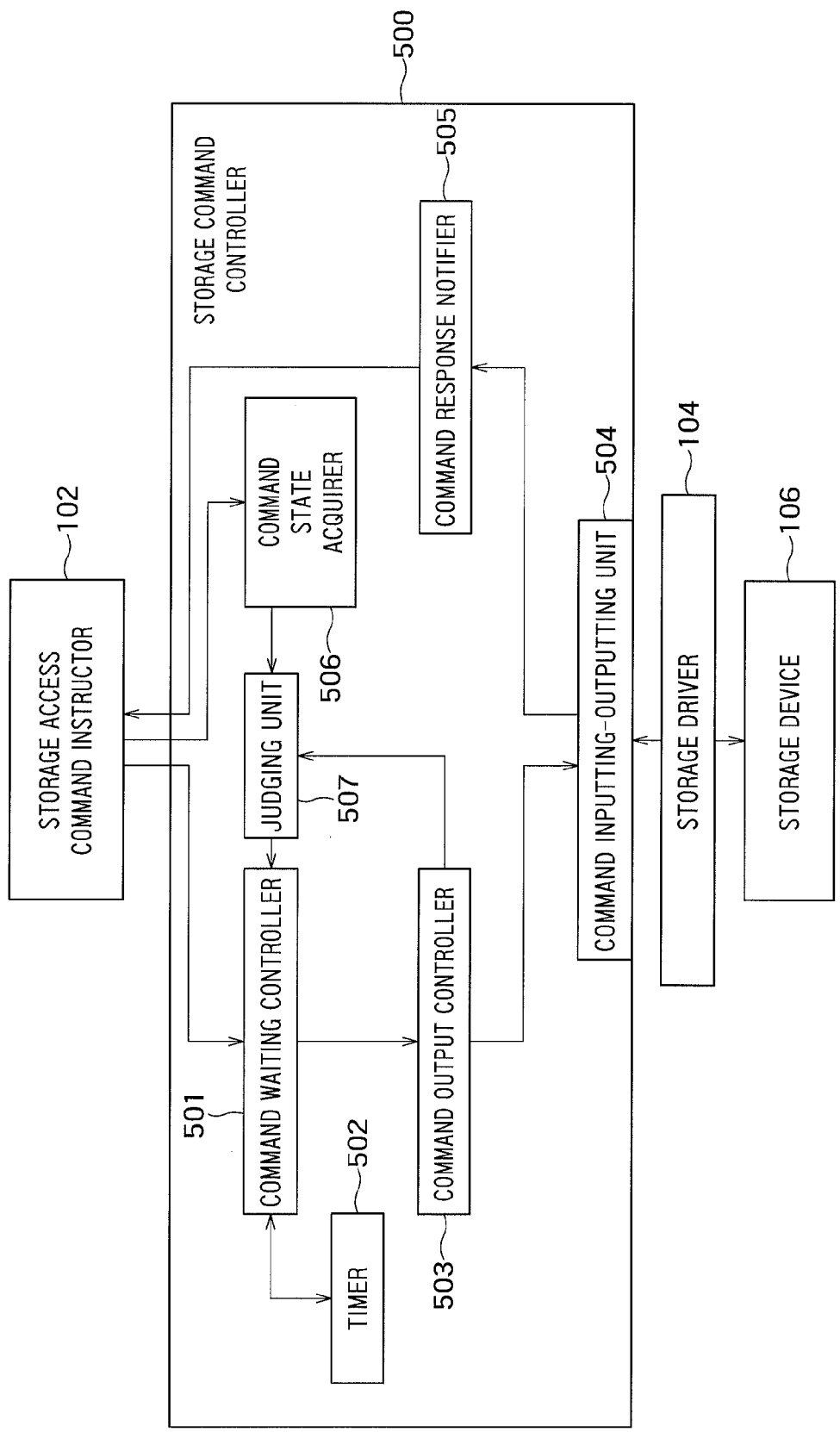
FIG. 5 is a block diagram showing a detailed configuration of a storage-installed computer according to a fourth embodiment.

FIG. 5 shows a detailed configuration of a storage-installed computer according to a fourth embodiment.

A command state acquirer 506 and a judging unit 507 are added to the storage command controller according to the first embodiment. The behavior of the other elements in a storage command controller 500, that is, a command waiting controller 501, a timer 502, a command output controller 503, a command inputting-outputting unit 504, and a command response notifier 505, is basically the same as the elements with the same names in the first embodiment, and repetitive descriptions are omitted except where a process is extended.

The command state acquirer 506 performs the same operation as the third embodiment, and therefore the descriptions are omitted.

Whenever outputting a write command to the command inputting-outputting unit 504, the command output controller 503 outputs an output notice of the write command and the information of the writing data volume to the judging unit 507.

When a waiting read command is present in the storage access command instruction unit 102, the judging unit 507 judges whether the write command involves the data erasing process in the storage device. That is, it judges whether the data erasing process is performed before the execution of the write command. The judgment is performed based on the history of previous output write commands, for example, the history of the number of the write commands or the data volumes by the write commands. When the history of the write commands meets a predetermined condition that is given in advance, the judgment that the data erasing process is likely to occur is made. For example, when the total of the writing data volumes after a writing involving the data erasing process was performed last time reaches or exceeds a threshold, the judgment that the data erasing process is likely to occur is made. In this case, the judging unit 507 increases the value of the output interval time and instructs the information of the increased value to the command waiting controller 501.

When the judgment that the data erasing process has been performed in the storage device 504 is made, the judging unit 507 instructs a decrease in the output interval time (for example, the restoration of the initial value) to the command waiting controller 501. Similarly to the third embodiment, whether the data erasing process has been performed may be judged by whether the time after the output of a command and before the return of the command response exceeds a threshold. Also, in the case of including a mechanism to notify that the storage device has performed the data erasing process, it is possible to judge that the data erasing process has been performed, with a notice from the storage device.

The command waiting controller 501 controls the output interval time of write commands, in response to instruction from the judging unit 507.

From the above, according to the embodiment, when it is expected that the delay of the reading access is great, it is possible to prevent many write commands from accumulating in the storage device 106 before a read command. Therefore, it is possible to suppress an increase in the delay of the reading access.

Fifth Embodiment

Figure 6:
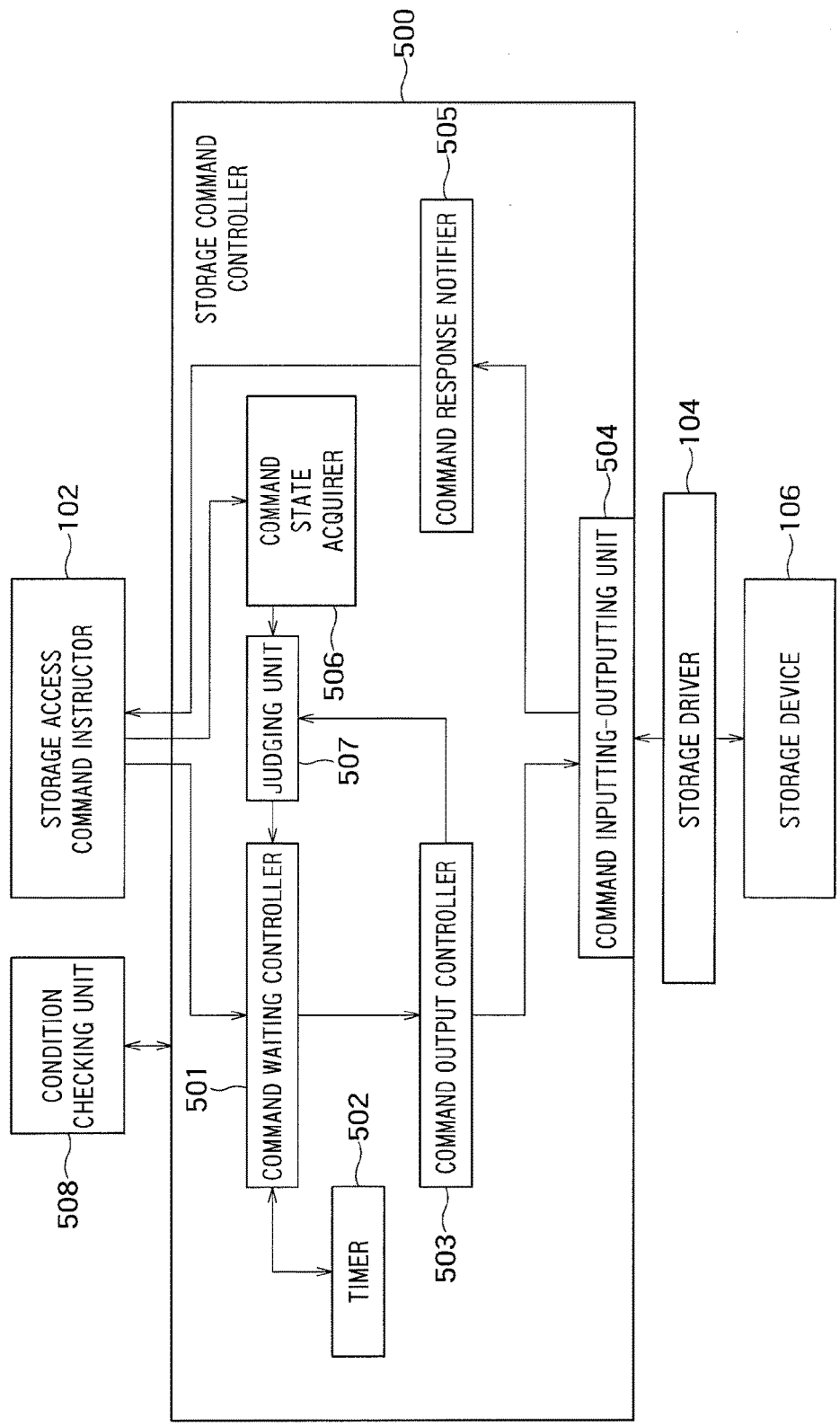
FIG. 6 is a block diagram showing a detailed configuration of a storage-installed computer according to a fifth embodiment.

FIG. 6 shows a detailed configuration of a storage-installed computer according to a fifth embodiment.

A condition checking unit 508 is added to the fourth embodiment. The condition of occurrence of the data erasing process, described in the fourth embodiment, seems to be different depending on the storage device (for example, makers, model numbers, or the like). Therefore, it is difficult to fix the condition for judging whether the data erasing process occurs, in advance. Accordingly, the condition checking unit 508 performs a writing test for a storage device to be used, in advance, and measures the time after the output of a write command and before the return of the command response (the duration of the writing access). The output interval of write commands may be a sufficiently great[large] value. When the duration of the writing access exceeds a threshold, the judgment that the data erasing process has occurred is made. By repeating such a test, the condition checking unit 508 specifies the condition in which the data erasing process occurs, and notifies the specified condition to the judging unit 507.

From the above, according to the embodiment, by acquiring the condition in which the data erasing process of a flash memory (for example, a NAND-type flash memory) is performed in a storage device, it is possible to prevent an accumulation of write commands and suppress an increase in the delay of the reading access, regardless of the kind of a storage device to be used.

The storage installed computer of embodiments as described above may also be realized using a general-purpose computer device as basic hardware. That is, processing of each block in the storage command controller can be realized by causing a processor mounted in the above general-purpose computer device to execute a program. In this case, each block in the storage command controller may be realized by installing the above described program in the computer device beforehand or may be realized by storing the program in a storage medium such as a CD-ROM or distributing the above described program over a network and installing this program in the computer device as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

According to at least one of the embodiments described above, it is possible to suppress an increase in the response time in the reading access to a storage device.

The invention claimed is:

1. A storage controlling device comprising:
a receiver to receive write commands and read commands for a storage device, from an internal or external command issuing device, wherein the read commands comprise at least a first read command, and the write commands comprise at least first a first write command and a second write command, wherein the second write command is received most recently before the first write command among the write commands; and
a controller to output the second write command, hold the first write command until at least a first interval time has elapsed after outputting the second write command, and output the first write command after the first interval time has elapsed,
wherein when the first read command is received while the first write command is being held, the controller outputs the first read command before outputting the first write command,
wherein the controller sets a value of the first interval time according to a volume of data being written by the second write command.

2. The storage device according to claim 1,
wherein the controller outputs the first read command, the first write command and the second write command, to one of the storage device and a storage driver accessing the storage device.

3. The device according to claim 1,
wherein the controller determines the value of the first interval time based on maximum, minimum, median, or mean of the volume of data being written by the second write command.

4. The storage controlling device according to claim 3,
wherein the controller sets the value of the first interval time according to whether the response time is greater than a threshold.

5. A storage controlling device comprising:
a receiver to receive write commands and read commands for a storage device, from an internal or external command issuing device, wherein the read commands comprise at least a first read command, and the write commands comprise at least first a first write command and a second write command, wherein the second write command is received most recently before the first write command among the write commands;
a controller to output the second write command, hold the first write command until at least a first interval time has elapsed after outputting the second write command, and output the first write command after the first interval time has elapsed,
wherein when the first read command is received while the first write command is being held, the controller outputs the first read command before outputting the first write command; and
the controller measures a response time from when the first read command, the first write command or the second write command is output until a command response returned from the storage device is received,
wherein the controller increases a value of the first interval time, as the response time becomes greater.

6. A non-transitory computer readable medium having instructions stored therein which, when executed by a computer, causes the computer to execute steps comprising:
receiving write commands and read commands for a storage device, from an internal or external command issuing device, wherein the read commands comprise at least a first read command, and the write commands comprise at least first a first write command and a second write command, wherein the second write command is received most recently before the first write command among the write commands;
outputting the second write command, holding the first write command until at least a first interval time has elapsed after outputting the second write command, and outputting the first write command after the first interval time has elapsed;
when the first read command is received while the first write command is being held, outputting the first read command before outputting the first write command; and
setting a value of the first interval time according to a volume of data being written by the second write command.

7. The non-transitory computer readable medium of claim 6 further comprising:
measuring a response time from when the first read command, the first write command or the second write command is output until a command response returned from the storage device is received; and
increasing a value of the first interval time, as the response time becomes greater.

8. A storage controlling method comprising:
receiving write commands and read commands for a storage device, from an internal or external command issuing device, wherein the read commands comprise at least a first read command, and the write commands comprise at least first a first write command and a second write command, wherein the second write command is received most recently before the first write command among the write commands;
outputting the second write command, holding the first write command until at least a first interval time has elapsed after outputting the second write command, and outputting the first write command after the first interval time has elapsed;
when the first read command is received while the first write command is being held, outputting the first read command before outputting the first write command; and
setting a value of the first interval time according to a volume of data being written by the second write command.

9. The storage controlling method of claim 8, further comprising:
measuring a response time from when the first read command, the first write command or the second write command is output until a command response returned from the storage device is received; and increasing a value of the first interval time, as the response time becomes greater.

10. A storage system comprising:

a receiver to receive write commands and read commands for a storage device, from an internal or external command issuing device, wherein the read commands comprise at least a first read command, and the write commands comprise at least first a first write command and a second write command, wherein the second write command is received most recently before the first write command among the write commands;

a storage device having a storage area for storing data, executing the first read command to read out data from the storage area and executing each of the first write command and the second write command to write data into the storage area; and a controller to output the second write command to the storage device or a storage driver accessing the storage device, hold the first write command until at least a first interval time has elapsed after outputting the second write command, and output the first write command to the storage device or the storage driver after the first interval time has elapsed, wherein when the first read command is received while the first write command is being held, the controller outputs the first read command before outputting the first interval time to the storage device or the storage driver, wherein the controller sets a value of the first interval time according to a volume of data being written by the second write command.

11. The storage system of claim 10, wherein the controller increases a value of the first interval time, as the response time becomes greater.

* * * * *